United States Patent [19]
Allen et al.

[11] Patent Number: 5,942,733
[45] Date of Patent: *Aug. 24, 1999

[54] STYLUS INPUT CAPACITIVE TOUCHPAD SENSOR

[75] Inventors: Timothy P. Allen, Los Gatos; Richard R. Schediwy, Union City; Federico Faggin, Los Altos Hills, all of Calif.

[73] Assignee: Synaptics, Inc., San Jose, Calif.

[*] Notice: This patent is subject to a terminal disclaimer.

[21] Appl. No.: 08/545,152

[22] Filed: Oct. 19, 1995

Related U.S. Application Data

[63] Continuation-in-part of application No. 08/300,387, Sep. 2, 1994, which is a continuation-in-part of application No. 08/115,743, Aug. 31, 1993, Pat. No. 5,374,787, which is a continuation-in-part of application No. 07/895,934, Jun. 8, 1992.

[51] Int. Cl.$^6$ .................................................. G08C 21/00
[52] U.S. Cl. .................................. 178/18.01; 178/18.06; 178/19.03
[58] Field of Search ..................................... 345/173, 176, 345/178, 179; 178/18.01, 18.03, 18.06, 19.01, 19.03

[56] References Cited

U.S. PATENT DOCUMENTS

| 4,455,452 | 6/1984 | Schuyler | 345/173 |
|---|---|---|---|
| 4,516,112 | 5/1985 | Chen | 340/365 |
| 4,526,043 | 7/1985 | Boie et al. | 73/862.04 |
| 4,550,221 | 10/1985 | Mabusth | 345/173 |

(List continued on next page.)

FOREIGN PATENT DOCUMENTS

| 0 187 372 | 12/1985 | European Pat. Off. | G01B 7/00 |
|---|---|---|---|
| 0 394 614 | 10/1990 | European Pat. Off. | G06F 3/033 |
| 0 574 213 | 6/1993 | European Pat. Off. | G06K 11/16 |
| 0 609 021 | 1/1994 | European Pat. Off. | G06K 11/16 |
| 0 589 498 | 3/1994 | European Pat. Off. | G06K 11/16 |
| 60-205625 | 10/1985 | Japan | G06F 3/03 |
| 62-126429 | 6/1987 | Japan | G06F 3/033 |
| 63-073415 | 4/1988 | Japan | G06F 3/033 |
| 2-040614 | 2/1990 | Japan | G02G 1/133 |
| 4-015725 | 1/1992 | Japan | G06F 3/033 |
| 6 139022 | 5/1994 | Japan | G06F 3/033 |
| 2 288 665 | 4/1995 | United Kingdom | G06K 11/12 |
| 91/05327 | 4/1991 | WIPO | G09G 3/02 |
| 96/18179 | 6/1996 | WIPO | G08C 21/00 |

OTHER PUBLICATIONS

"Pressure–Sensitive Icons", IBM Technical Disclosure Bulletin, Jun. 1990, vol. 33, No. 1B, pp. 277–278.

(List continued on next page.)

*Primary Examiner*—Vijay Shankar
*Attorney, Agent, or Firm*—D'Alessandro & Ritchie

[57] ABSTRACT

A capacitive touch pad comprises a substrate material, such as a PC board type laminate material, having a plurality of first parallel conductive traces running in a first (X) direction disposed on a first face thereof, and a plurality of second parallel conductive traces running in a second (Y) direction, usually orthogonal to the first direction, disposed on an opposed second face thereof. A layer of pressure-conductive material is disposed over one of the faces of the substrate. A protective layer with a conductive coating on its back surface is disposed over the top surface of the pressure-conductive material to protect it. In an alternate embodiment, a capacitive touch sensor comprises a rigid substrate material having a conducting material disposed on one face thereof. A layer of pressure-conductive material is disposed over the conductive material on the substrate. A flexible material, having a plurality of first parallel conductive traces running in a first (X) direction disposed on a first face thereof, and a plurality of second parallel conductive traces running in a second (Y) direction disposed on an opposed second face thereof is disposed over the layer of pressure-conductive material. A protective layer is disposed over the top surface of the pressure conductive material to protect it. In yet another embodiment, an air gap is used in place of the layer of pressure-conductive material and the upper layers are supported by a frame at the periphery of the touchpad.

36 Claims, 2 Drawing Sheets

U.S. PATENT DOCUMENTS

| | | | |
|---|---|---|---|
| 4,550,310 | 10/1985 | Yamaguchi et al. | 340/365 |
| 4,794,208 | 12/1988 | Watson | 178/19 |
| 4,811,004 | 3/1989 | Person et al. | 178/18 |
| 4,922,061 | 5/1990 | Meadows et al. | 178/19 |
| 5,117,071 | 5/1992 | Greanias et al. | 178/19 |
| 5,153,572 | 10/1992 | Caldwell et al. | 340/712 |
| 5,159,159 | 10/1992 | Ashev | 178/18 |
| 5,220,130 | 6/1993 | Kent | 178/18 |
| 5,365,254 | 11/1994 | Kawamoto | 345/157 |
| 5,374,787 | 12/1994 | Miller et al. | 178/18 |
| 5,386,219 | 1/1995 | Greanias et al. | 345/174 |
| 5,563,632 | 10/1996 | Roberts | 345/173 |

OTHER PUBLICATIONS

"Scroll Control Box", IBM Technical Disclosure Bulletin, Apr. 1993, vol. 36, No. 4, pp. 399–403.

Wilton, Microsoft Windows 3 Developer's Workshop, 1991, pp. 229–230.

Tiburtius, "Transparente Folientastaturen", Feinwerktechnik & Messtechnik 97, No. 7, Munchen, DE, Jul. 1989, pp. 299–300.

STYLUS INPUT CAPACITIVE TOUCHPAD SENSOR

RELATED APPLICATIONS

This application is a continuation-in-part of application Ser. No. 08/300,387, filed Sep. 2, 1994, which is a continuation-in-part of application Ser. No. 08/115,743, filed Aug. 31, 1993, now U.S. Pat. No. 5,374,787, which is a continuation-in-part of application Ser. No. 07/895,934, filed Jun. 8, 1992.

GOVERNMENT LICENSE RIGHTS

The U.S. Government has a paid-up license in this invention and the right in limited circumstances to require the patent owner to license others on reasonable terms as provided for by the terms of contract No. N00014-95-C-0047 awarded by the Office of Naval Research.

BACKGROUND OF THE INVENTION

1. Field of the Invention

The present invention relates to computers and computer cursor control input devices. More particularly, the present invention relates to a capacitive touch pad suitable for accepting input from a non-conductive stylus.

2. The Prior Art

Capacitive touch sensing devices (touchpads) are currently known in the art and are available from several manufacturers. The principle advantage of capacitive touch technology is sensitivity to fingers. Only very light contact is required to accurately detect the position of a finger on the pad. This feature makes capacitive touch sensors especially suitable as computer pointing devices.

Capacitive sensors have, so far, been limited to detecting conductive objects which create a large area of contact on the pad and have sufficient capacitance to be detected (for example, human fingers). Objects which are either small or not conductive are difficult to detect capacitively because they have very little capacitance. Thus, a plastic stylus or pen cannot be reliably and accurately detected by existing capacitive sensors. This limitation has excluded capacitive touch sensors from applications, such as graphics tablets, which may require pen input.

Resistive touch sensing devices are also well-known in the art, and substantially preceded capacitive touchpads in the market. Most resistive sensing devices require substantial pressure on the surface in order to accurately determine the point of contact. A stylus, which produces a small region of high contact pressure, is easily detected by resistive sensors. A light finger touch is difficult to detect using resistive technology, since the touch force is distributed over a larger area and there is no region of high contact pressure. Resistive technology has been adopted for applications which allow for greater contact force or do not require much positioning accuracy (e.g. touch screens).

While resistive touch sensing technology has existed for decades, it has never been widely adopted for computer pointing devices. Not until the light touch sensitivity made possible by the recent introduction of capacitive sensors have users accepted touchpads as a preferred input device in computer applications.

It is an object of the present invention to provide a capacitive touchpad which overcomes some of the limitations of the prior art.

It is an object of the present invention to provide a capacitive touchpad which can accept input from a non-conductive stylus.

It is a further object of the present invention to provide a capacitive touchpad which can accept input from a non-conductive stylus or a light finger touch.

BRIEF DESCRIPTION OF THE INVENTION

According to a first embodiment of the present invention, a capacitive touch pad comprises a substrate material, such as a PC board type laminate material, having a plurality of first parallel conductive traces running in a first (X) direction disposed on a first face thereof, and a plurality of second parallel conductive traces running in a second (Y) direction, usually orthogonal to the first direction, disposed on an opposed second face thereof. These three lower three layers (X and Y sensor traces, with PC board laminate in between) comprise the sensor matrix of a standard touchpad. A layer of compliant material is disposed over one of the faces of the substrate. An applique with a conductive coating on its back surface is affixed to the top surface of the compliant material.

According to a second embodiment of the present invention, a capacitive touch pad comprises a substrate material, such as a PC board type laminate material, having a plurality of first parallel conductive traces running in a first (X) direction disposed on a first face thereof, and a plurality of second parallel conductive traces running in a second (Y) direction, usually orthogonal to the first direction, disposed on an opposed second face thereof. These three lower three layers (X and Y sensor traces, with PC board laminate in between) comprise the sensor matrix of a standard touchpad. A layer of pressure-conductive material is disposed over one of the faces of the substrate. An applique with a conductive coating on its back surface is affixed to the top surface of the pressure conductive material.

According to a third embodiment of the present invention, a capacitive touch sensor suitable for stylus or light finger touch input comprises a rigid substrate material, such as a PC board laminate material having a conducting material disposed on one face thereof. A layer of pressure-conductive material is disposed over the conductive material on the substrate. A layer of flexible material, such as a mylar or polyimide material, having a plurality of first parallel conductive traces running in a first (X) direction disposed on a first face thereof, and a plurality of second parallel conductive traces running in a second (Y) direction, usually orthogonal to the first direction, disposed on an opposed second face thereof is disposed over the layer of pressure-conductive material. An applique is affixed to the top surface of the pressure conductive material to protect it.

BRIEF DESCRIPTION OF THE DRAWING FIGURES

DETAILED DESCRIPTION OF A PREFERRED EMBODIMENT

Figure 1:
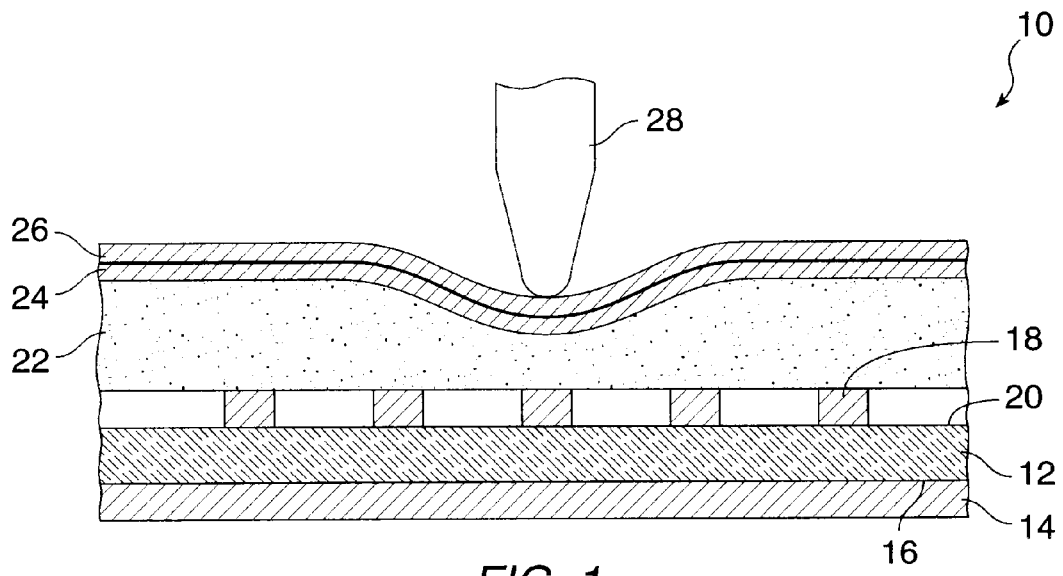
FIG. 1 is a cross sectional view of a capacitive touch sensor according to a first embodiment of the present invention employing a compliant material.

Those of ordinary skill in the art will realize that the following description of the present invention is illustrative only and not in any way limiting. Other embodiments of the invention will readily suggest themselves to such skilled persons.

According to the present invention, various embodiments of a novel touchpad sensor device are disclosed which extend the ability of established touchpad technology to work with a passive stylus. This new sensor design allows the use of any hard object as a stylus pointer (either conductive or non-conductive), while retaining all the present capacity to detect light finger touch.

The touchpad sensor design of the present invention may be used with electronics hardware and software systems such as those disclosed and claimed in co-pending application Ser. No. 08/300,387, filed Sep. 2, 1994, co-pending application Ser. No. 08/115,743, filed Aug. 31, 1993, now U.S. Pat. No. 5,374,787, and co-pending application Ser. No. 07/895,934, filed Jun. 8, 1992, and necessitates no change to the existing electronics or software. The touchpad sensor of the present invention employs a novel use of materials in the capacitive sensing matrix. Several alternative approaches based on the same basic principle are described.

In each of the embodiments of the invention described herein, the capacitive touchpad of the present invention employs a sensor matrix. In two of the disclosed embodiments, the sensor matrix comprises a thin substantially rigid layer of insulating material on which is disposed a grid composed of X conductive traces on a first face of the layer of insulating material, and Y traces on a second face of the layer of insulating material. This structure is typically implemented as ordinary copper traces on the top two layers of a multilayer printed circuit board. In the third embodiment of the present invention, a flexible sensor as a sensor matrix is implemented as conductive traces printed on opposing faces of a flexible substrate rather than a laminated circuit board. Flexible sensors have so far been made by two distinct methods. According to the first method, conductive ink is screen-printed on a mylar substrate. According to the second method, copper traces are etched on a polyimide substrate (flex circuit technology). These fabrication methods are illustrative and not limiting. As will be readily understood by persons of ordinary skill in the art, the X and Y conductive traces in all of the embodiments of the present invention are adapted to be electrically coupled to sensing circuitry, most typically via connection contacts located on edges of the touchpad in the X and Y planes. This feature of the present invention, which is found in all prior art touchpads, is so rudimentary and well understood that the drawing figures herein will not be unnecessarily cluttered by illustration of this feature, assumed to be well within the level of ordinary skill in the art.

For the purposes of this disclosure, a passive stylus is any object suitable for writing or drawing on a flat surface. A passive stylus does not contain any electronic components, and need not have any special electrical properties or be made of any special materials. The device must be somewhat pointed, easily held, and usable in the same manner as a pen.

Referring first to FIG. 1, a capacitive touchpad sensor 10 according to the present invention is shown in cross-sectional view. Capacitive touchpad sensor 10 includes a sensor matrix disposed on a substantially rigid substrate 12. Substrate 12 may be formed from a piece of standard printed circuit board material having a thickness in the range of from between about 0.025 mm to about 0.1 mm. A plurality of first conductive traces 14 running in a first (X) direction is disposed on a first face 16 of substrate 12. A plurality of second conductive traces 18 running in a second (Y) direction, typically orthogonal to the first direction, is disposed on a second face 20 of substrate 12. First and second conductive traces 14 and 18 may typically be formed by patterning and etching copper clad circuit board material as is well known in the art, or by equivalent known methods. Typical line spacing is in the range of between about 1.5 mm and about 10 mm.

A layer of compliant material 22 is disposed over the second face 20 and the plurality of second conductive traces 18. Compliant material 22 may have a thickness of between about 0.125 mm and about 1.25 mm and may be a layer of compliant foam, which is a sheet of elastic material which deforms under pressure and springs back to its original shape when released. Many materials, some of which are not actually foams, exhibit this behavior, including various rubbers and silicone gels. Typical materials for use in this embodiment of the invention include, but are not limited to Sylgard silicone dielectric gel available from Dow Corning of Midland, Mich., or Poron cellular urethane sheet available from Rogers Corporation of Rogers, Conn. For purposes of this disclosure, all such materials will be referred to as compliant foams. Compliant foams can be manufactured over a wide range of stiffness, commonly quantified by a measure called durometer hardness. Materials with a durometer hardness in a range of from about 0.1 to about 10 are suitable for use in the present invention. Materials with a durometer hardness greater than 10 are unsuitable for this application.

A conductive layer 24 is disposed over the upper surface of the layer of compliant material 22 and a protective overlayer 26 is disposed over the upper surface of the conductive layer 24. As presently preferred, a mylar applique is employed as the protective overlayer 26. The protective overlayer 26 is the part of the capacitive touchpad sensor 10 actually touched and seen by the user. As such, it should preferably have a pleasing tactile and visual texture. The protective overlayer 26 is typically implemented as a sheet of textured polyester material, sold under the tradename Mylar, from about 0.1 mm to about 0.6 mm thick with an adhesive layer on its underside for affixing it to the top of the layer of compliant material 24. Mylar is generally transparent, so the back surface may either be painted to give a uniform appearance, or logos, lettering, or other patterns can be screen-printed on the back side in lieu of a uniform coat of paint. Those of ordinary skill in the art will realize that protective overlayer 26 need not be made out of mylar. Other materials like polycarbonate, sold under the tradename Lexan, also make suitable covers. In an embodiment employing polycarbonate, the sheet thickness is in a range of about 0.1 mm to about 0.6 mm.

Conductive layer 24 may be a very thin (less than 0.025 mm) layer of metal or other conductor uniformly applied to a substrate. For example, it is possible to apply a conductive coating to a mylar applique by painting one surface of the mylar with conductive ink. A conductive coating can also be realized by sputtering a thin coating of metalization onto the mylar. By applying a conductive coating to a mylar applique, a flexible ground plane can be realized and conductive layer 24 and protective overlayer 26 may be thus combined such that they may be applied in a single assembly step.

The various layers of the capacitive touchpad sensor 10 of FIG. 1 are joined together using a suitable adhesive, such as Scotch brand core series 2-1300 0.25 mm thick adhesive film. Those of ordinary skill in the art will recognize that other suitable adhesives may be used.

With no finger or stylus in contact with the surface of the capacitive touchpad sensor 10, the ground plane formed by the conductive layer 24 will appear to the sensor matrix as a uniform background capacitance. If sensing electronics like those described in U.S. Pat. No. 5,374,787 or in co-pending application Ser. No. 08/300,387 are employed, background capacitance is ignored because of continuously self-calibrating measurement algorithms.

When a stylus 28 presses on the surface of capacitive touchpad sensor 10, the protective overlayer 26 and compliant material 22 will deform around the area of contact as shown in FIG. 1. This has the effect of pushing the conductive layer 24 closer to the first and second conductive traces 14 and 18 of the sensor matrix. The closer proximity of conductive layer 24 will increase the capacitance measured by the sensor matrix, and appear as a contact signal. The size of the contact signal is determined by the magnitude and shape of the deformation around the stylus 28. Wider, deeper deformations will yield a larger signal.

The size and shape of the deformation is controlled by several factors. First, the amount of force applied by the tip of stylus 28 affects the deformation. In addition, the stiffness (modulus) of the protective overlayer 26 is a factor. A stiffer surface will tend to form a wider, shallower deformation. Finally, the stiffness (durometer hardness) of the compliant material 22 affects the size and shape of the deformation. A stiffer material will tend to form a narrower, shallower deformation.

Ideally, under moderate stylus force the capacitive touchpad sensor 10 of the present invention should yield a signal strength comparable to a finger touch on an ordinary non-stylus touchpad sensor. By implication, the region of surface deformation created by moderate stylus force should be about the diameter of a finger contact patch (about 1 cm) and deep enough in the center to almost touch the conductive traces 18 of the sensor matrix. This requirement can theoretically be met by suitable selection of materials.

Stiffer Complaint materials 22 will always yield a smaller signal. Thus, it is desirable to select the most compliant material 22 possible and then select a surface with a stiffness appropriate to give the desired deformation width. In practice, it is difficult to find compliant materials that yield satisfactory signals under moderate stylus pressure. Silicone gels are among the most compliant materials investigated, and even they do not give a satisfactory signal.

Those of ordinary skill in the art will recognize that the conductive coating on the bottom of the protective overlayer 26 effectively forms a ground plane over the top of the sensor matrix. While this necessary for the detection of a non-conductive stylus, as has been described above, it renders the pad insensitive to a light finger touch as a practical matter. A finger touching the protective overlayer 26 without any deformation is completely shielded from the sensor matrix by the conductive coating, hence will yield no signal whatsoever. If the finger applies heavy enough pressure to deform the surface, it will be detected in the same manner as the stylus 28.

So, while a sensor according to the embodiment of the invention depicted in FIG. 1 is theoretically suitable for detecting a stylus, it suffers from two significant drawbacks. First, as a practical matter, it is difficult to find a combination of a compliant material 22 and a protective overlayer 26 with the desired combination of material properties for producing a commercially-acceptable contact signal for both finger and stylus sensing.

Figure 2:
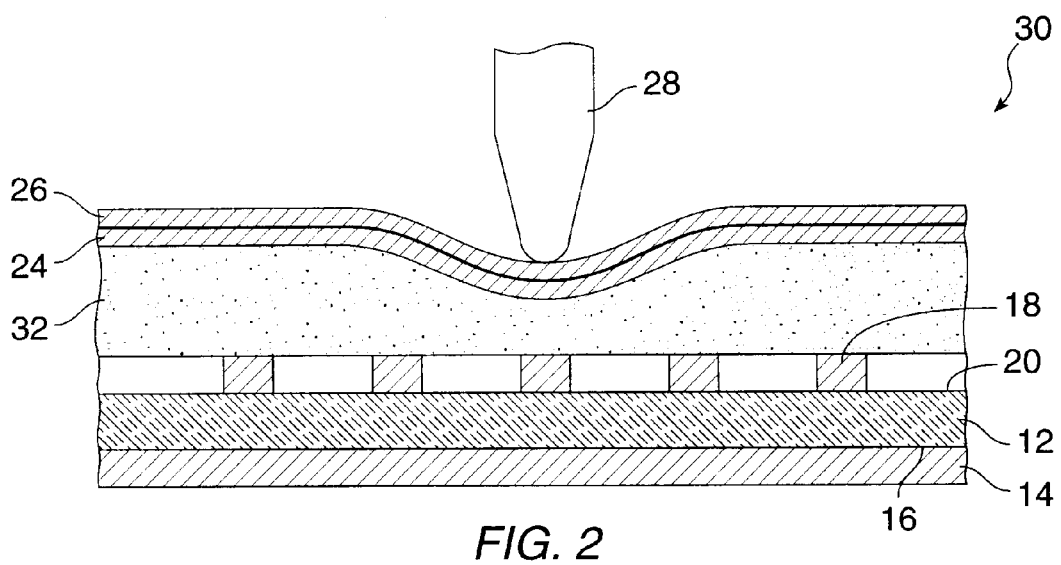
FIG. 2 is a cross sectional view of a capacitive touch sensor according to a second embodiment of the present invention employing a pressure-conductive material.

Referring now to FIG. 2, a second embodiment of the present invention is shown in cross sectional view. The embodiment shown in FIG. 2 is in most respects identical to the embodiment depicted in FIG. 1 and thus corresponding structural elements of the two embodiments will be assigned like reference numerals in the figures for ease of comparison by persons of ordinary skill in the art. Furthermore, the thicknesses of particular layers of materials in the embodiment of FIG. 2 which correspond to layers in the embodiment of FIG. 1 may have the same thicknesses as the layers in the embodiment of FIG. 1.

Capacitive touchpad sensor 30 of FIG. 2 includes a sensor matrix disposed on a substantially rigid substrate 12. A plurality of first conductive traces 14 running in a first (X) direction is disposed on a first face 16 of substrate 12. A plurality of second conductive traces 18 running in a second (Y) direction, typically orthogonal to the first direction, is disposed on a second face 20 of substrate 12. In this respect, the sensor matrix of this embodiment of the invention is identical to that shown in FIG. 1.

The first limitation of the sensor shown in FIG. 1 (difficulty in finding materials that yield enough signal) can be addressed by using a layer of pressure-conductive material 32 in place of the compliant material 22 of the embodiment of FIG. 1.

Pressure-conductive material 32 may be formed from a class of compliant foam materials specially designed to have unusual electrical properties. In the present invention, thicknesses from between about 0.125 mm and about 1.25 mm may be employed. Under normal conditions, the sheet is an electrical insulator. When pressure is applied which tends to compress the sheet in thickness, the material becomes conductive (less resistive) in the compressed region. A material called Pressure Sensing Membrane, presently under development by 3M Corporation is suitable for this purpose. This material is only conductive in the Z (thickness) axis when compressed. Other materials conduct homogeneously when compressed. Either type of material is suitable for this application.

For use in the present invention, sheet thicknesses between 0.125 mm and 1.25 mm is best for the layer of pressure-conductive material 32. Since pressure conductive materials create a capacitive effect electrically, rather than through mechanical deformation, the durometer hardness of the material is not particularly important.

A conductive layer 24 is disposed over the upper surface of the layer of pressure conductive material 32 and a protective overlayer 26 is disposed over the upper surface of the conductive layer 24. These layers may be identical to their counterparts in the embodiment of FIG. 1.

As in the embodiment of FIG. 1, with no stylus or finger on the pad, the pressure-conductive material 32 of capacitive touchpad 30 of FIG. 2 will be an insulator separating the conductive traces 14 and 18 of the sensor matrix from the conductive layer 24, which will appear as a uniform background capacitance. When a stylus 28 applies pressure to the surface, the protective overlayer 26 will be deformed, bringing the conductive layer 24 somewhat closer to the conductive traces 14 and 18 of the sensor matrix. But, more importantly, the pressure-conductive material 32 will be compressed in a region around the tip of the stylus 28. Thus, the region of pressure-conductive material 32 near the stylus 28 will become a conductive object in direct contact with the surface of the sensor matrix. The capacitance of the nearby conductive traces 14 and 18 of the sensor matrix will be increased somewhat by the nearer physical proximity of the conductive layer 24, but much more by the immediate electrical proximity of the conductive region formed by the pressure-conductive material 32. In effect, the formation of a conductive zone by the pressure-conductive material 32 brings the ground plane formed by the conductive layer 24 closer to the conductive traces 14 and 18 of the sensor matrix electrically, rather than physically.

Since physical deformation is no longer the primary mechanism for sensing the stylus, the stiffness of the pressure-conductive material 32 is not as important as it is in the embodiment of FIG. 1. Stylus touchpad sensors 30 with suitable sensitivity have been constructed in this manner.

The touchpad 30 of FIG. 2 suffers from the same relative insensitivity to a light finger touch as does the embodiment described with reference to FIG. 1. The conductive traces 14 and 18 of the sensor matrix are still shielded from the finger by the conductive layer 24.

Figure 3:
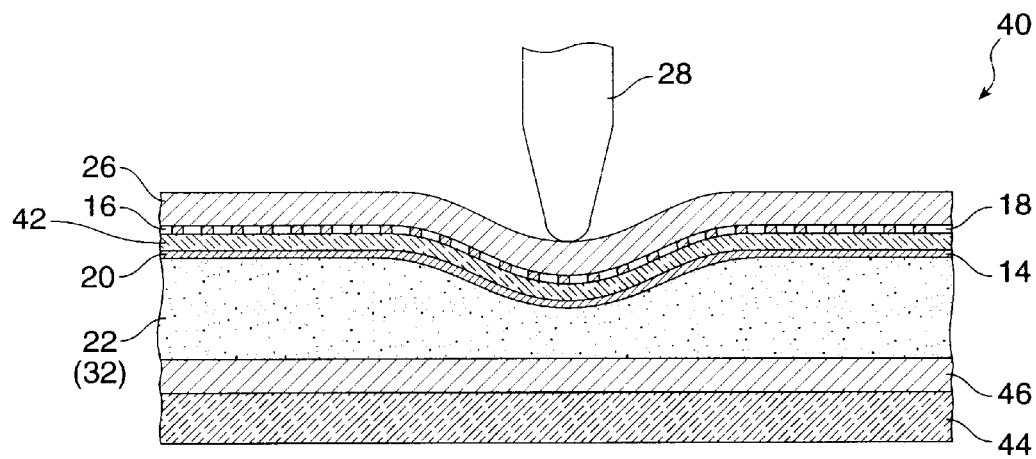
FIG. 3 is a cross sectional view of a capacitive touch sensor according to a third embodiment of the present invention.

Referring now to FIG. 3, a capacitive touchpad sensor 40 according to a third embodiment of the present invention is shown in cross sectional view. Touchpad sensor 40 is suitable for detecting either a light finger touch or a non-conductive (or, for that matter, conductive) stylus.

Capacitive touchpad sensor 40 employs a flexible sensor matrix as previously described. A flexible sensor matrix is implemented as conductive traces 14 and 18 disposed on opposing faces 16 and 20 of a flexible substrate 42. According to the present invention method, conductive ink traces screen-printed on a mylar substrate 42 form conductive traces 14 and 18, or copper lines forming conductive traces 14 and 18 are etched on a flexible polyimide substrate 42.

As may be seen from an examination of FIG. 3, touchpad sensor 40 is somewhat inverted from the sensors described with reference to FIGS. 1 and 2. That is, a rigid substrate material 44, formed from a material such as a piece of PC board material has a conductive layer 46 disposed on its upper surface forming a ground plane. A layer of compliant material 22 like that disclosed in the embodiment of FIG. 1, is disposed over the surface of conductive layer 46. The sensor matrix comprising the flexible substrate 42 and conductive traces 14 and 18 is disposed over the surface of compliant material 22. Finally, protective overlayer 26 is disposed over the upper surface 20 of the flexible substrate and conductive traces 18. No conductive layer is necessary under protective overlayer 26 as was necessary in the embodiments of FIGS. 1 and 2.

Since the sensor matrix comprising flexible substrate 42 and conductive traces 14 and 18 is now immediately beneath the protective overlayer 26, the sensor matrix is no longer shielded from finger capacitance as it was in the embodiments of FIGS. 1 and 2. Therefore, the touchpad sensor 40 of FIG. 3 will have the same sensitivity to a light finger touch as a conventional capacitive touchpad implemented on a PC board. In either case, the conductive traces 14 and 18 of the sensor matrix are separated from the finger only by the thickness of the protective overlayer 26.

When a stylus 28 presses on the surface of the touchpad 40, the protective overlayer 26, flexible substrate 42, and compliant material 22 will all deform in the region of the tip of the stylus 28. Whereas, in the touchpads 10 and 30 of FIGS. 1 and 2, respectively, this had the effect of bringing a flexible ground plane closer to a fixed sensor matrix, it now has the opposite effect. The flexible sensor matrix comprising the flexible substrate 42 and conductive traces 14 and 18 is brought closer to a fixed ground plane comprising conductive layer 46. In both structures, the result is an increase in the capacitance of the sensor matrix and, thus, the capacitive detection of the tip of the stylus 28.

As previously noted, replacing the compliant material 22 of the embodiment of FIG. 1 with the pressure-conductive material of the embodiment of FIG. 2 renders the touchpad 30 of FIG. 2 far more sensitive to a stylus. This same principle applies equally well to the touchpad 40 of FIG. 3. If layer 22 is replaced with a layer of pressure-conductive material 32 (reference numeral shown in parenthesis in FIG. 3), the resultant structure is sensitive to either a light finger touch or a passive stylus.

For a conventional capacitive sensor, the traces of one of the two sets of conductive traces 14 or 18 (the one on top) must necessarily be closer to the finger than the other set. This does not impede the operation of the sensor, but it is well known that signals measured from the top axis are noticeably larger than signals measured from the bottom axis.

This parasitic effect can be used to advantage in the structure shown in FIG. 3. By noting which of the two sets of traces has a stronger contact signal, software can determine whether the sensor is being activated by a stylus or a finger. If a finger is creating the signal, the capacitance is applied to the top of the structure, and the top axis will have a bigger signal. If a stylus is used, the capacitive effect is introduced underneath the sensor, and the bottom axis will have a larger signal. The ability to detect the difference between pen and finger activation is useful, for example, in selecting between absolute and relative positioning modes in a paint program. This information is useful to software applications in general.

Those of ordinary skill in the art will recognize that the substrate 44 supporting the ground plane of conductive layer 46 underneath the compliant material 22 need not be implemented as a flat rigid structure such as a PC board. It could alternatively be implemented as a conductive coating applied to a flexible substrate. In such an embodiment, the sensor assembly could then be applied to any curved hard surface.

Alternative implementations of the present invention are possible. In the touchpads shown in FIGS. 1 and 3, the compliant material can be replaced by an air gap. This gap can be formed by suspending the protective overlayer 26 (and the flexible substrate 42 of FIG. 3) on spacers around the periphery of the touchpad area. If the space between the Flexible Sensor and the ground plane is a gap rather than layer of compliant material, it is much easier for moderate pen pressure to create a large signal. Such an airgap touchpad sensor can be easily constructed so that even moderate stylus pressure forces the flexible substrate into direct contact with the underlying ground plane.

Figure 4:
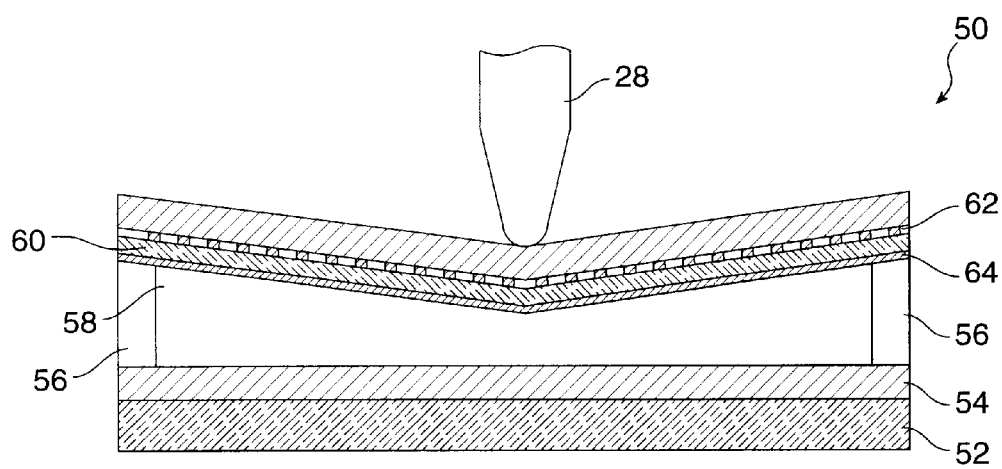
FIG. 4 is a cross sectional view of a capacitive touch sensor according to a third embodiment of the present invention employing an air gap.

Referring now to FIG. 4, a cross sectional view of a capacitive touchpad sensor employing such an airgap is shown. Capacitive touchpad sensor 50 is formed on a rigid substrate material 52, formed from a material such as a piece of PC board, rigid substrate material 52 has a conductive layer 54 disposed on its upper surface forming a ground plane. A frame member 56 is formed over substrate 52 (and optionally over conductive layer 54, around the periphery of capacitive touchpad sensor 50 and defines an air gap region 58.

A composite structure comprising a flexible substrate 60 having a plurality of first spaced-apart parallel conductive lines 62 running in a first direction disposed on a first face and a plurality of second spaced-apart parallel conductive lines 64 running in a second direction perpendicular to the first direction disposed on a second face is mounted on frame 56 over air gap region 58.

There are several advantages to capacitive touchpad sensor 50. First, there is no need for compliant material, pressure-conductive film or other special materials. In addition, the capacitive touchpad sensor 50 of FIG. 4 will yield a large signal from moderate stylus pressure.

Unfortunately, as seen from FIG. 4, the shape of the depression formed by a stylus 28 on capacitive touchpad sensor 50 is not the symmetric depression shown for the embodiments of FIGS. 1–3 herein. Instead, the surface will be deformed in the manner of an inverted tent, with the "peak" of the tent being the tip of the stylus 28, and the "base" of the tent being the frame 56 around the periphery of the pad.

This tent deformation will influence the capacitance of the sensor matrix over its entire area, not just in the region of the stylus tip 28. Many present touchpads report position as the centroid of the capacitive profile on their surfaces. The tent deformation created by a stylus on an airgap sensor such as capacitive touchpad sensor 50 can (and frequently does) have a centroid which does not correspond to the point of contact. This may lead to undesirable artifacts when an airgap sensor is used as a pointing device.

There are two possible solutions for the distortion of the distortion of the capacitive centroid caused by tent deformation. First, as will be appreciated by those of ordinary skill in the art, a peak-finding rather than a centroid-finding approach can be used to determine position. Alternately, using software to remap the position and pressure reported by the sensor can correct for the centroid distortion after-the-fact.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A capacitive touch pad comprising:
   a rigid substrate having first and second opposing faces;
   an X-trace layer having a plurality of first parallel conductive traces running in a first direction, said first parallel sensing conductive traces lying in a plane parallel to said first face of said substrate, said X-trace layer disposed on said first face of said substrate;
   a Y-trace layer having a plurality of second parallel sensing conductive traces running in a second direction orthogonal to said first direction, said second parallel sensing conductive traces lying in a plane parallel to said second face of said substrate, said Y-trace layer disposed on said second face of said substrate;
   a layer of compliant material disposed said substrate;
   a layer of conducting material disposed on an upper surface of said layer of compliant material; and
   a protective layer disposed on an upper surface of said layer of conducting material.

2. A capacitive touch pad as recited in claim 1, wherein said layer of compliant material comprises rubber.

3. A capacitive touch pad as recited in claim 1, wherein said layer of compliant material comprises silicone gel.

4. A capacitive touch pad as recited in claim 1, wherein said layer of compliant material has a durometer hardness in a range from about 0.1 to about 10.

5. A capacitive touch pad as recited in claim 1, wherein said protective layer comprises a sheet of textured polyester having a thickness in a range from about 0.1 mm to about 0.6 mm.

6. A capacitive touch pad as recited in claim 5, wherein said layer of conducting material comprises a conductive coating disposed on a bottom surface of said sheet of textured polyester.

7. A capacitive touch pad as recited in claim 1, wherein said protective layer comprises a sheet of polycarbonate having a thickness in a range from about 0.1 mm to about 0.6 mm.

8. A capacitive touch pad as recited in claim 7, wherein said layer of conducting material comprises a conductive coating disposed on a bottom surface of said sheet of polycarbonate.

9. A capacitive touch pad comprising:
   a rigid substrate having first and second opposing faces;
   an X-trace layer having a plurality of first parallel sensing conductive traces running in a first direction, said first parallel sensing conductive traces lying in a plane parallel to said first face of said substrate, said X-trace layer disposed on said first face of said substrate;
   a Y-trace layer having a plurality of second parallel sensing conductive traces running in a second direction orthogonal to said first direction, said second parallel sensing conductive traces lying in a plane parallel to said second face of said substrate, said Y-trace layer disposed on said second face of said substrate;
   a layer of pressure-conductive material disposed over said substrate;
   a layer of conducting material disposed on an upper surface of said layer of pressure-conductive material; and
   a protective layer disposed on an upper surface of said layer of conducting material.

10. A capacitive touch pad as recited in claim 9, wherein said layer of pressure-conductive material has a thickness in the range of 0.125 mm to about 1.25 mm.

11. A capacitive touch pad as recited in claim 9, wherein said protective layer comprises a sheet of textured polyester having a thickness in a range from about 0.1 mm to about 0.6 mm.

12. A capacitive touch pad as recited in claim 11, wherein said layer of conducting material comprises a conductive coating disposed on a bottom surface of said sheet of textured polyester.

13. A capacitive touch pad as recited in claim 9, wherein said protective layer comprises a sheet of polycarbonate having a thickness in a range from about 0.1 mm to about 0.6 mm.

14. A capacitive touch pad as recited in claim 13, wherein said layer of conducting material comprises a conductive coating disposed on a bottom surface of said sheet of polycarbonate.

15. A capacitive touch pad comprising:
   a rigid substrate material having a conducting material disposed on one face thereof;
   a layer of pressure-conductive material disposed over said conducting material;
   a layer of flexible material, having an X-trace layer having a plurality of first parallel sensing conductive traces running in a first direction, said first parallel sensing conductive traces lying in a plane parallel to said first face of said substrate, said X-trace layer disposed on said first face of said substrate and having a Y-trace layer having a plurality of second parallel sensing conductive traces running in a second direction orthogonal to said first direction, said second parallel sensing conductive traces lying in a plane parallel to said second face of said substrate, said Y-trace layer disposed on said second face of said substrate; and a protective layer disposed on an upper surface of said layer of flexible material.

16. A capacitive touch pad as recited in claim 15, wherein said layer of flexible material comprises a sheet of textured polyester having a thickness in a range from about 0.1 mm to about 0.6 mm.

17. A capacitive touch pad as recited in claim 16, wherein said first and second parallel conductive traces comprise a conductive coating disposed on said sheet of textured polyester.

18. A capacitive touch pad as recited in claim 15, wherein said layer of flexible material comprises a sheet of polycarbonate having a thickness in a range from about 0.1 mm to about 0.6 mm.

19. A capacitive touch pad as recited in claim 18, wherein said first and second parallel conductive traces comprise a conductive coating disposed on said sheet of polycarbonate.

20. A capacitive touch pad as recited in claim 15, wherein said layer of pressure-conductive material has a thickness in the range of 0.125 mm to about 1.25 mm.

21. A capacitive touch pad comprising:

a rigid substrate material having a conducting material disposed on one face thereof;

a frame disposed around a periphery of said rigid substrate material, said frame defining an air gap;

a layer of flexible material, having an X-trace layer having a plurality of first parallel sensing conductive traces running in a first direction, said first parallel sensing conductive traces lying in a plane parallel to said first face of said substrate, said X-trace layer disposed on said first face of said substrate and having a Y-trace layer having a plurality of second parallel sensing conductive traces running in a second direction orthogonal to said first direction, said second parallel sensing conductive traces lying in a plane parallel to said second face of said substrate, said Y-trace layer disposed on said second face of said substrate; and a protective layer disposed on an upper surface of said layer of pressure conductive material.

22. A capacitive touch pad as recited in claim 21, wherein said layer of flexible material comprises a sheet of textured polyester having a thickness in a range from about 0.1 mm to about 0.6 mm.

23. A capacitive touch pad as recited in claim 22, wherein said first and second parallel conductive traces comprise a conductive coating disposed on said sheet of textured polyester.

24. A capacitive touch pad as recited in claim 21, wherein said layer of flexible material comprises a sheet of polycarbonate having a thickness in a range from about 0.1 mm to about 0.6 mm.

25. A capacitive touch pad as recited in claim 24, wherein said first and second parallel conductive traces comprise a conductive coating disposed on said sheet of polycarbonate.

26. A capacitive touch pad comprising:

a rigid substrate material having a conducting material disposed on one face thereof;

a layer of compliant material disposed over said conducting material;

a layer of flexible material, having an X-trace layer having a plurality of first parallel sensing conductive traces running in a first direction, said first parallel sensing conductive traces lying in a plane parallel to said first face of said substrate, said X-trace layer disposed on said first face of said substrate and having a Y-trace layer having a plurality of second parallel sensing conductive traces running in a second direction orthogonal to said first direction, said second parallel sensing conductive traces lying in a plane parallel to said second face of said substrate, said Y-trace layer disposed on said second face of said substrate; and a protective layer disposed on an upper surface of said layer of flexible material.

27. A capacitive touch pad as recited in claim 26, wherein said layer of flexible material comprises a sheet of textured polyester having a thickness in a range from about 0.1 mm to about 0.6 mm.

28. A capacitive touch pad as recited in claim 27, wherein said first and second parallel conductive traces comprise a conductive coating disposed on said sheet of textured polyester.

29. A capacitive touch pad as recited in claim 26, wherein said layer of flexible material comprises a sheet of polycarbonate having a thickness in a range from about 0.1 mm to about 0.6 mm.

30. A capacitive touch pad as recited in claim 29, wherein said first and second parallel conductive traces comprise a conductive coating disposed on said sheet of polycarbonate.

31. A capacitive touch pad as recited in claim 26, wherein said layer of compliant material comprises rubber.

32. A capacitive touch pad as recited in claim 26, wherein said layer of compliant material comprises silicone gel.

33. A capacitive touch pad as recited in claim 26, wherein said layer of compliant material has a durometer hardness in a range from about 0.1 to about 10.

34. The capacitive touch pad of claim 1, wherein said compliant material is chosen such that pressure on said protective layer allows detection by said X-trace layer and said Y-trace layer without said layer of conducting material coming in contact with either said X-layer or said Y-layer.

35. The capacitive touch pad of claim 9, wherein said pressure-conductive material is chosen such that pressure on said protective layer allows detection by said X-trace layer and said Y-trace layer without said layer of conducting material coming in contact with either said X-layer or said Y-layer.

36. The capacitive touch pad of claim 15, wherein said pressure conductive material is chosen such that pressure on said protective layer allows detection by said X-trace layer and said Y-trace layer without said layer of conducting material coming in contact with either said X-layer or said Y-layer.

\* \* \* \* \*